(12) United States Patent
Yang

(10) Patent No.: US 10,386,450 B2
(45) Date of Patent: Aug. 20, 2019

(54) METHOD AND SYSTEM FOR REFINED POSITIONING VIA INTERSECTION OF HYPER ZONES

(71) Applicant: SIGNIFY HOLDING B.V., Eindhoven (NL)

(72) Inventor: Hongming Yang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 43 days.

(21) Appl. No.: 15/537,074

(22) PCT Filed: Nov. 30, 2015

(86) PCT No.: PCT/EP2015/078049
§ 371 (c)(1),
(2) Date: Jun. 16, 2017

(87) PCT Pub. No.: WO2016/096384
PCT Pub. Date: Jun. 23, 2016

(65) Prior Publication Data
US 2017/0350957 A1    Dec. 7, 2017

(30) Foreign Application Priority Data

Dec. 17, 2014  (EP) .................................... 14198611

(51) Int. Cl.
*G01S 1/68*  (2006.01)
*G01S 5/02*  (2010.01)

(52) U.S. Cl.
CPC .............. *G01S 5/0252* (2013.01); *G01S 1/68* (2013.01); *G01S 5/02* (2013.01); *G01S 5/0284* (2013.01)

(58) Field of Classification Search
CPC . G01S 5/0252; G01S 1/68; G01S 5/02; G01S 5/0284
See application file for complete search history.

(56) References Cited

U.S. PATENT DOCUMENTS

| 8,049,666 B2 * | 11/2011 | Doh ........................ G01S 5/02 342/363 |
| 2004/0203904 A1 * | 10/2004 | Gwon .................. G01S 5/0252 455/456.1 |
| 2005/0128143 A1 * | 6/2005 | Dempsey ................ G01S 5/12 342/463 |
| 2005/0261004 A1 | 11/2005 | Dietrich et al. |

(Continued)

FOREIGN PATENT DOCUMENTS

| WO | 2011022568 A2 | 2/2011 |
| WO | 2014083494 A2 | 6/2014 |

(Continued)

*Primary Examiner* — Gennadiy Tsvey
(74) *Attorney, Agent, or Firm* — Meenakshy Chakravorty

(57) ABSTRACT

The present invention relates to a system and a method for refined zoning via intersection. Specifically, anchor nodes (200) of a zone-based positioning system are divided into multiple hyper zones (40, 50) in different ways, where the different ways of dividing the hyper zones may be orthogonal to each other, with possibly partial overlapping. For each way of dividing the hyper zones (40, 50), the most likely candidate hyper zone is selected based on a user zoning method. Thereafter, the intersection (42) of the identified hyper zones is taken as the final location result of a mobile node to be located.

13 Claims, 4 Drawing Sheets

(56) References Cited

U.S. PATENT DOCUMENTS

| | | | |
|---|---|---|---|
| 2008/0012767 A1 | 1/2008 | Caliri et al. | |
| 2008/0285530 A1 | 11/2008 | Dietrich et al. | |
| 2009/0093956 A1* | 4/2009 | Wu | G01C 21/20 |
| | | | 701/469 |
| 2009/0209268 A1* | 8/2009 | Ha | G01S 5/0289 |
| | | | 455/456.1 |
| 2009/0264141 A1* | 10/2009 | Green | G01S 5/02 |
| | | | 455/500 |
| 2012/0028652 A1* | 2/2012 | Wirola | G01S 5/0252 |
| | | | 455/456.1 |
| 2013/0155102 A1* | 6/2013 | Gonia | H04W 64/00 |
| | | | 345/629 |
| 2016/0187460 A1* | 6/2016 | Zeng | G01S 5/14 |
| | | | 375/133 |
| 2017/0055334 A1* | 2/2017 | Pandharipande | H04W 4/04 |

FOREIGN PATENT DOCUMENTS

| | | |
|---|---|---|
| WO | 2014127246 A1 | 8/2014 |
| WO | 2015162295 A1 | 10/2015 |

\* cited by examiner

METHOD AND SYSTEM FOR REFINED POSITIONING VIA INTERSECTION OF HYPER ZONES

CROSS-REFERENCE TO PRIOR APPLICATIONS

This application is the U.S. National Phase application under 35 U.S.C. § 371 of International Application No. PCT/EP2015/078049, filed on Nov. 30, 2015, which claims the benefit of European Patent Application No. 14198611.7, filed on Dec. 17, 2014. These applications are hereby incorporated by reference herein.

FIELD OF THE INVENTION

The invention relates to the field of positioning methods and systems which are adapted to use a zone-based approach with a grid of anchor nodes, such as but not limited to an indoor location system for a lighting system where each luminaire is equipped with a radio transceiver. These radio transceivers serve as reference points, called anchor nodes, for the positioning of a mobile node, such as a device carried by a user.

BACKGROUND OF THE INVENTION

In a free-field situation, a radio propagation model can be used to compute the distance between two radio units from the received signal strength, provided that the transmit power of the transmitting unit is known. When several radio anchors (i.e., radio units with known locations) are present, the received signal strengths can be used to estimate the location of a radio unit by means of trilateration.

Indoor location systems are becoming more and more popular, with a lot of applications such as user navigation, target advertisement, geo-fencing, and the like. However, the accuracy of trilateration approaches is limited due to large ambiguities in the radio propagation model in an environment that cannot be considered as a free field, i.e., any environment containing structures that interact with radio signals and that can cause distortions to the radio signals. A typical non-free-field situation is an interior of a building, wherein walls, floors, furniture and various physical structures interact with radio signals in a complex manner that differs substantially from a free-field situation.

It is however possible to locate a single radio unit relative to a plurality of radio anchors, operating in the radio frequency (RF) domain in a non-free-field environment, by using the signal strengths received between the radio unit and the radio anchors.

A typical indoor location system may comprise at least three components. Firstly, there are one or more target mobile devices to locate, called mobile nodes. The second component is a group of reference points of known locations, called anchor nodes. The third component is a computing entity, called location engine, to compute the relative locations of the mobiles nodes in relation to the anchor nodes.

In practice, the performance of the zone-based approach, as described for example in the WO2014/083494A2, is dependent on the number of anchor nodes per zone. The more anchors in each zone, the better the zoning result that can be achieved. However, given a density of anchor nodes such as the luminaires of a lighting network in an indoor environment, the size of each zone in turn gets larger. As a consequence, the resolution of the location result is compromised due to the enlarged size of each zone. This side effect is highly undesirable since it is the aim of any typical indoor location system to achieve location results with high resolution.

To obtain reliable indoor location performance for the zone-based approach with a higher accuracy resolution, it is desirable to increase the spatial density of anchor nodes, resulting in additional system cost and complexity.

SUMMARY OF THE INVENTION

It is an object of the present invention to provide an improved location system and method, by means of which refined indoor location performance can be achieved without any additional system cost and complexity.

This object is achieved by an apparatus as claimed in claim 1, by a radio device as claimed in claim 7, by a location system as claimed in claim 9, by a lighting network as claimed in claim 11, by a method as claimed in claim 12, and by a computer program product as claimed in claim 13.

Accordingly, anchor nodes are divided into multiple hyper zones in at least two different ways to obtain at least two different types of hyper zones, wherein for each type of hyper zone a single hyper zone is selected based on the average received signal quality for the links between the target node and the anchor nodes within the hyper zone, and wherein the intersection of the selected hyper zones of the different types is taken as the final zoning result for the mobile node. Thereby, refined user location results can be obtained without increasing the density of anchor nodes. Each hyper zone still consists of multiple anchor nodes, so that the operation of averaging received signal quality over space is still performed, which results in reliable zoning results. By taking the intersection of the identified hyper zones, e.g., in orthogonal directions, smaller zones are obtained, which leads to a better resolution of the location result, without compromising the reliability of the zoning performances. If the anchor nodes were instead divided in a non-overlapping manner such that each zone corresponds to a smaller number of anchor nodes, the same zone resolution can still be obtained, but at the expense of losing the benefit of spatial averaging for higher reliability of the zoning result.

According to a first option, the selection unit may be adapted to calculate the single hyper-zone signal strength or quality for each of the identified hyper zones by averaging the received respective signal strength or quality information of radio links of anchor nodes belonging to the hyper zone. Thus, processing load of the proposed improved zone-based location approach can be kept low by a simple averaging processing of the signal strength or quality values obtained for the respective links of the anchor nodes belonging to each hyper zone.

According to a second option which can be combined with the first option, the hyper zones of intersecting types may be configured to extend in orthogonal directions. Such an orthogonal arrangement of intersecting hyper zones leads to the advantage of a straight forward determination of intersection regions based on a simple row-column structure.

According to a third option which can be combined with the above first or second option, the signal strength or quality information of the links may comprise an RSSI value. The RSSI value is readily available in wireless communication system, so that the proposed zone-based location approach can be easily implemented.

According to a fourth option which can be combined with any of the above first to third option, the hyper zones of intersecting types may be configured to overlap each other partially. Such overlap areas can be used in cases where the radio unit is located near the border of hyper zones and the location system is inconclusive about the hyper zone in which the radio unit is located. Then, the location system may locate the radio system to the overlap region as a smaller hyper zone region so as to effectively enhance the spatial resolution.

According to a fifth option which can be combined with any of the above first to fourth option, the identification, selection and intersection units may be comprised in a localization unit which is configured as a programmable processing unit for performing the operations and computations to derive an estimated location of the radio unit. This option provides the advantage of a highly flexible localization unit which can be reprogrammed in case of changing conditions or environments. As an example, the number, size and geographical arrangement of the hyper zones could be adapted to system changes or environmental changes.

It is noted that the above apparatus may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1, the radio device of claim 7, the location system of claim 9, the lighting network of claim 11, the method of claim 12, and the computer program product of claim 13 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a location system for an indoor system with a plurality of radio anchors or anchor nodes at known locations for localizing a radio unit or mobile node with unknown location.

According to various embodiments, the zone-based approach is used for localization or positioning, wherein a dense grid of anchor nodes is provided in the indoor system. Of particular interest is the indoor lighting system, where each luminaire is equipped with a radio transceiver. In such systems, received signal strength indicator (RSSI) values or other signal quality indicators can be obtained for the link between the mobile node and each anchor node. It is however noted that it does not matter whether the RSSI values are obtained by the mobile node when each anchor node transmits radio signals, or each anchor node obtains the RSSI values while the mobile node transmits radio signals. Due to the random nature of radio propagation properties, the obtained RSSI values are also of a random nature.

Reliable positioning results are achieved by averaging a significant number of RSSI values or other signal quality indicators, both over time and over space. Averaging over time per link can be done by determining the average of multiple RSSIs from different transmission signals (e.g., packets). To achieve the averaging operation in the space domain, a plural of adjacent anchor nodes are grouped together to form a zone. The average RSSI value per zone is then obtained by taking the average of the RSSI values for all possible links between the target mobile node and the anchor nodes within a zone. The principle underlying the zone-based approach is then to select the maximum RSSI value per zone, and the target mobile node is located to be within the geographical range of the selected zone of anchor nodes.

According to various embodiments, the location of the target mobile node is obtained with the zone-based approach, where the anchor nodes are divided into multiple hyper zones in at least two different ways, to obtain at least two different types of hyper zones. Then, a two-step zoning approach is applied, wherein, for each type of hyper zone, a single hyper zone is selected based on the average RSSI values for the links between the mobile node and the anchor nodes within the hyper zone, and then the intersection of the selected hyper zones of the different types is taken as the final zoning result for the target mobile node.

As an example, the different ways of dividing hyper zones into different types may be orthogonal to each other, so that the different types of hyper zones extend in orthogonal directions. Optionally, hyper zones of a single considered type may be partially overlapping.

Figure 1:
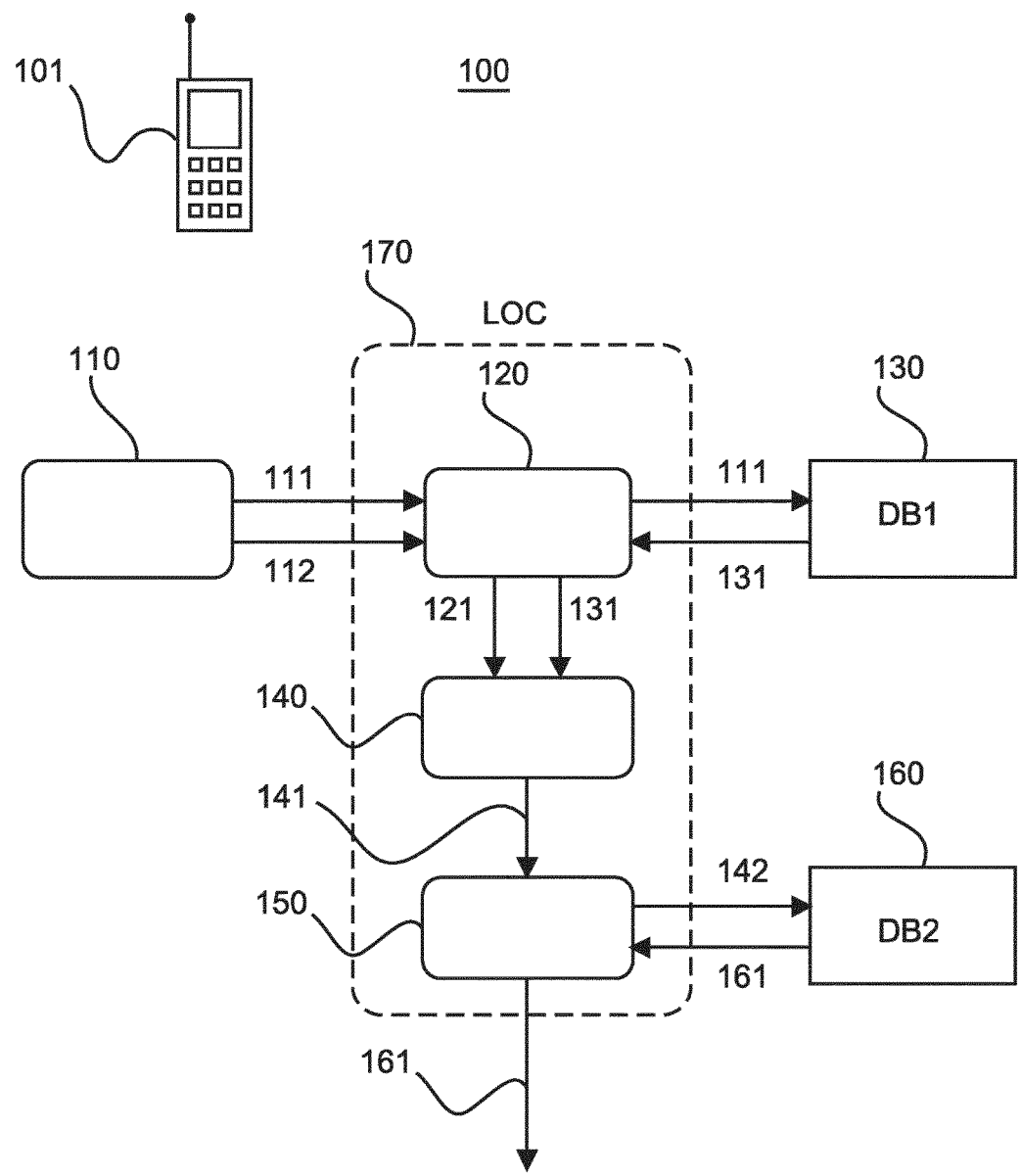
FIG. 1 shows a schematic block diagram of a localization apparatus according to a first embodiment.

FIG. 1 shows a schematic block diagram of location system 100 according to a first embodiment with a measuring unit 110, an identification unit 120, a selection unit 140 and an intersection unit 150, and two databases (DB1, DB2) 130 and 160. The two databases may be implemented by respective look-up tables or memory regions of a single data storage device. The measuring unit 110 is adapted to select anchor nodes (not shown in FIG. 1) and to measure signal strengths between a radio unit 101 and the selected anchor nodes. The measuring unit 110 passes on anchor node identifiers 111 and corresponding signal strength values (e.g., RSSI values) 112 to the identification unit 120. The identification unit 120 is adapted to fetch from the first database 130 hyper-zone identifiers 131 of two anchor group types of hyper zones which correspond to the anchor node identifiers 111, and then to compute hyper-zone signal strength values 121 for the fetched anchor groups of hyper zones of each type. The hyper-zone signal strength values 121 are single values which represent the signal strength of a respective anchor group of the hyper zone and may be computed as the average of the signal strength values of the anchor nodes of the anchor group of the respective hyper zone. The selection unit 140 then receives from the identification unit 120 the hyper-zone identifiers 131 of the different types and the corresponding computed hyper-zone signal strength values 121, and selects for each type of hyper zones the hyper zone with the highest group strength, wherein the selected hyper zones of each type are identified by their hyper-zone identifiers 141. Finally, the intersection unit 150 receives, from the selection unit 140, the hyper-zone identifiers 141 of each group type and determines an intersection region identifier 142 of the intersection region of the two identified hyper zones of the different types. Based on the determined intersection region identifier 142, the intersection unit 150 fetches the region coordinates 161 which correspond to the intersection region identifier 142 from the second database 160. The retrieved region coordinates 161 represent the estimated location of the radio unit 101. The intersection unit 150 then presents the region coordinates 161 as final output of the localization apparatus 100.

In FIG. 1, the combined identification, selection and intersection unit 120, 140, 150 may be comprised in a localization unit 170 which is configured as a programmable processing unit for performing the operations and computations to derive an estimated location of the radio unit 101 from the signal strength values 112 and corresponding anchor node identifiers 111.

Figure 2:
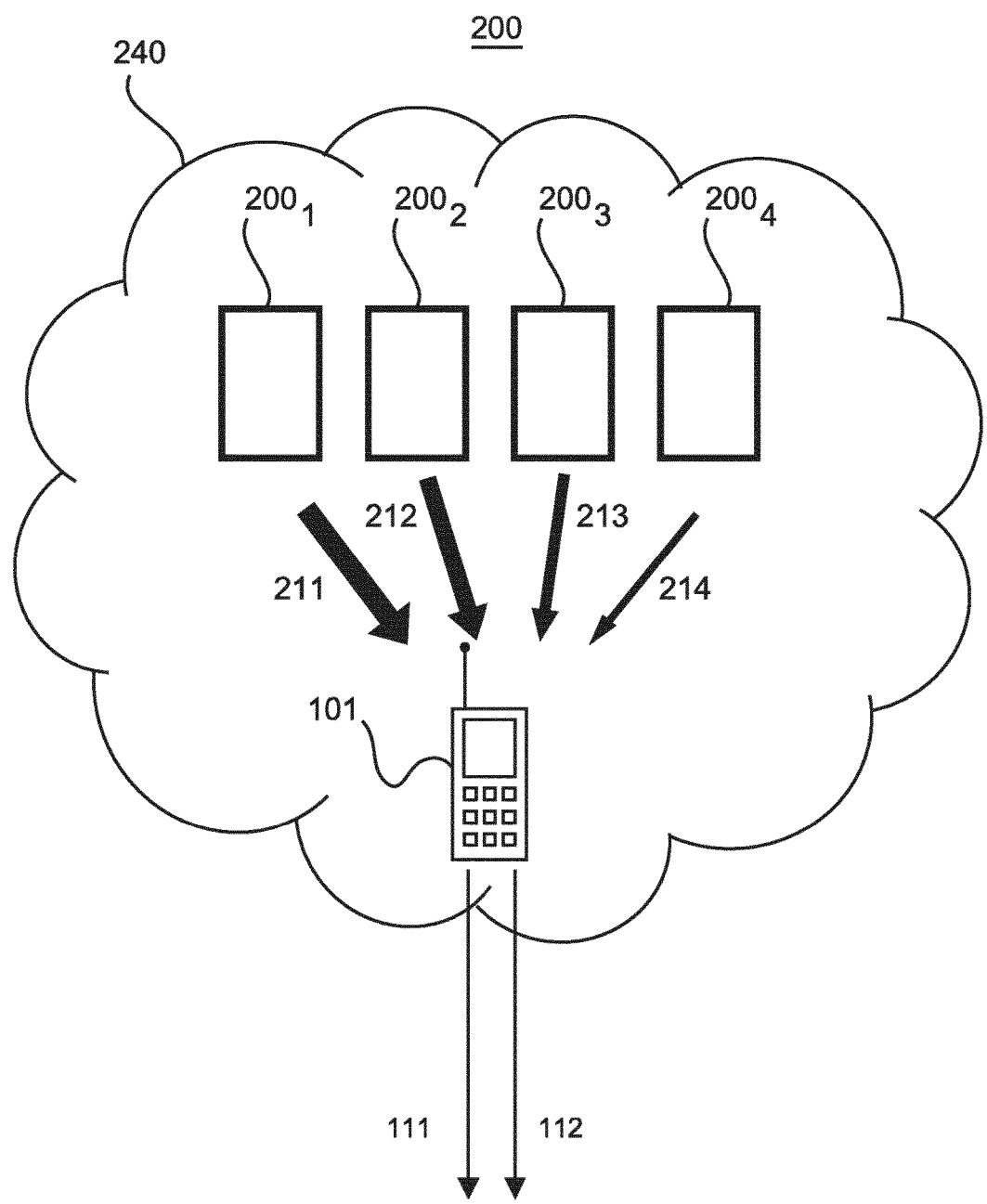
FIG. 2 shows a schematic system architecture according to a first option of the first embodiment, where a target radio unit receives radio signals sent by anchor nodes.
Figure 3:
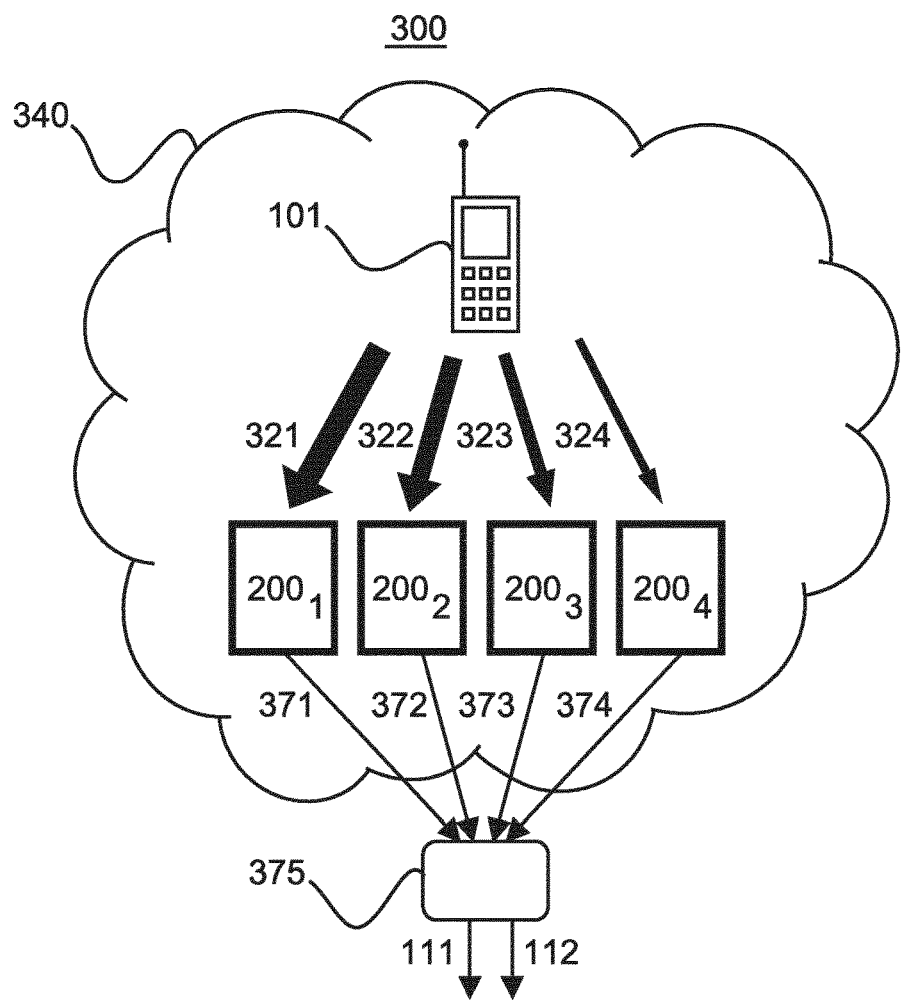
FIG. 3 shows a schematic system architecture according to a second option of the first embodiment, where anchor nodes receive radio signals sent by a target radio unit.

FIGS. 2 and 3 show two different embodiments with four anchor nodes $200_1$ to $200_4$ and the target radio unit 101, where the radio anchors and the radio unit of a location system 200 act in different roles as sender and receiver of the signal strength or quality indicator signal. Thus, the two embodiments include the functionality of the above measuring unit 110 of FIG. 1. The location system 200 is provided in a communication network (e.g., lighting network) 240 which is depicted as a cloud 240.

In the embodiment of FIG. 2, the target radio unit 101 is adapted to receive radio signals sent by the anchor nodes $200_1$ to $200_4$, so that the target radio unit 101 acts as the receiver and the anchor nodes $200_1$ to $200_4$ act as senders. The radio unit 101 receives signals 211 to 214 with different signal strength or quality (indicated by the thickness of the respective arrows in FIG. 2) from the anchor nodes $200_1$ to $200_4$. The radio unit 101 measures the strengths of the signals 211-214 and passes the anchor node identifiers 111 and corresponding signal strength values 112 to the selection unit 120 of FIG. 1. Thus, as indicated above, the depicted cloud 240 comprising the target radio unit 101 and the plurality of anchor nodes $200_1$ to $200_4$ can be interpreted as an embodiment of the measuring unit 110 in FIG. 1.

In the alternative embodiment of FIG. 3, the anchor nodes $200_1$ to $200_4$ are adapted to receive radio signals 321 to 324 with different signal strength or quality (indicated by the thickness of the respective arrows in FIG. 3) from the target radio unit 101 of a location system 300. Thus, in FIG. 3, the target radio unit 101 acts as a sender and the anchor nodes $200_1$ to $200_4$ act as receiver, as depicted in a cloud 340. The anchor nodes $200_1$ to $200_4$ are adapted to receive the signals 321 to 324 from the radio unit 101 with different signal strengths or quality and to signal respective signal strength values 371 to 374 to a collection unit 375 which is adapted to collect the signal strength values 112 from the anchor nodes $200_1$ to $200_4$ and to pass the signal strength values 112 and the corresponding anchor node identifiers 111 to the selection unit 120 of FIG. 1. Thus, as indicated above, the combination of the collection unit 375 and the depicted cloud 340 comprising the target radio unit 101 and the plurality of anchor nodes $200_1$ to $200_4$ can be interpreted as an embodiment of the measuring unit 110 in FIG. 1.

In an embodiment, the target radio unit 101 may be a mobile phone receiving radio signals transmitted by the anchor nodes $200_1$ to $200_4$ (e.g., radio transceivers of luminaires of a lighting network). The mobile phone measures the signal strengths or qualities of the radio signals and computes the estimated location of the mobile phone using the signal strengths or qualities. To achieve this, the mobile phone may comprise a localization unit to compute the estimated location based on the intersection area or region of selected hyper zones of different types and also database(s) or look-up table(s) that associate anchor nodes with anchor groups of the related hyper zones of different types and that associate the determined intersection region with related region coordinates.

In a variant of the previous embodiment, the mobile phone may measure the radio signals 211 to 214 transmitted by the anchor nodes $200_1$ to $200_4$, but, different from the previous embodiment, the mobile phone may not comprise the localization unit. Instead, the mobile phone sends the measured signal strength values 111, through a communication link (not shown), to a central programming unit (not shown) comprising the localization unit that computes the estimated location from the received measured signal strength values.

Figure 4:
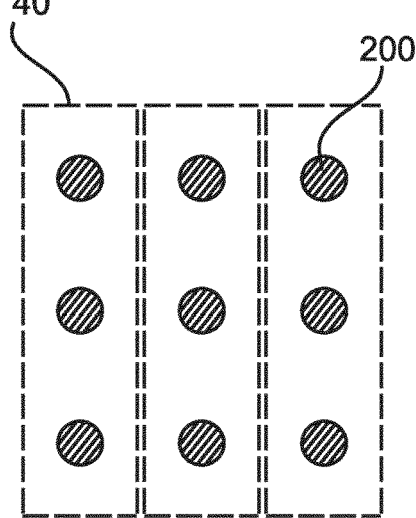
FIG. 4 shows an example of a hyper zone definition in a vertical direction.
Figure 5:
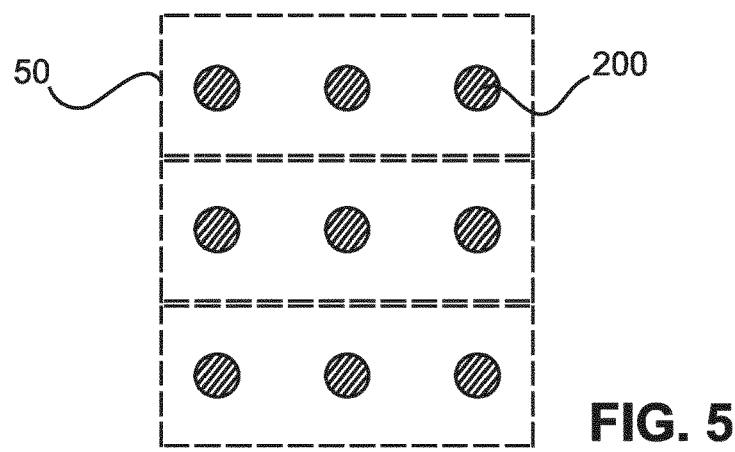
FIG. 5 shows an example of a hyper zone definition in a horizontal direction.

FIGS. 4 and 5 show illustrations of examples of hyper-zone definitions in two orthogonal ways, e.g., in vertical and horizontal direction, respectively. For the proposed hyper zoning approach of the examples of the embodiments, nine anchor nodes 200 are divided in two different and orthogonal ways into three hyper zones including respective anchor groups of three anchor nodes 200, i.e. first type of hyper zones 40 in the vertical direction and a second type of hyper zones 50 in the horizontal direction, as illustrated in FIGS. 4 and 5.

Next, for each set of hyper zones of different type, as defined in two different ways, an independent zoning operation is performed. For instance, for the hyper zones 40 in the vertical direction of FIG. 4, it can be decided that the target mobile node is located within the zone corresponding to the maximum average signal strength or quality value (e.g., RSSI value) per zone. As an example, the left-most hyper zone 40 of FIG. 4 may be identified. Similarly, a hyper zone in the horizontal direction can be selected. As an example, it may be assumed that the middle hyper zone 50 of FIG. 5 is identified.

Figure 6:
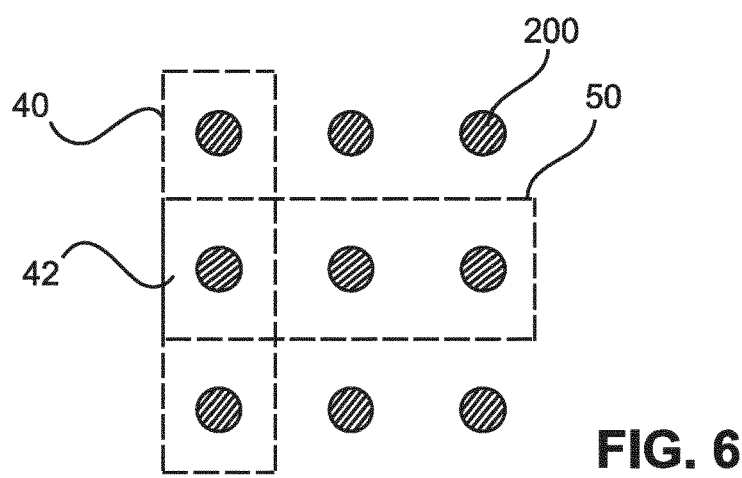
FIG. 6 shows an example of a final zoning result based on an intersection of selected vertical and horizontal hyper zones.

FIG. 6 shows an example of a final zoning result based on an intersection of selected vertical and horizontal hyper zones. As described above in connection with FIGS. 1 to 3, the final zoning result can be obtained by using the intersection area or region 42 of the identified hyper zones 40, 50 of the different orthogonal types. This intersection region 42 of the identified hyper zones 40, 50 can then be output as the final zoning result for the location of the target mobile phone.

A major advantage of the proposed hyper-zoning approach is that refined user location results can be obtained without increasing the density of the anchor nodes 200. As described above, each hyper zone still consists of multiple anchor nodes 200. Hence the operation of averaging the signal strength or quality over space is still performed to achieve the reliable zoning results. By taking the intersection of identified hyper zones in orthogonal directions, smaller zones are obtained, which leads to a higher resolution of the location result, without compromising reliability of the zoning performances. If the anchor nodes 200 of FIGS. 4 to 6 were divided into nine zones so that each zone corresponds to a single anchor node, the same zone resolution would be achieved, but the benefit of spatial averaging for the higher reliability in the zoning result would be lost.

It is noted that the topology and the two ways of dividing hyper-zones 40, 50 of the nine anchor nodes 200 in FIGS. 4 to 6 are presented as mere illustrative examples. The application of the present invention is neither limited to this exemplary topology nor to the two orthogonal ways of dividing the hyper zones 40, 50. Any other division which leads to smaller intersection regions can be used, such as diagonal divisional, circular or elliptical division, or any division by any patterns of different types with overlapping or intersecting regions.

Figure 7:
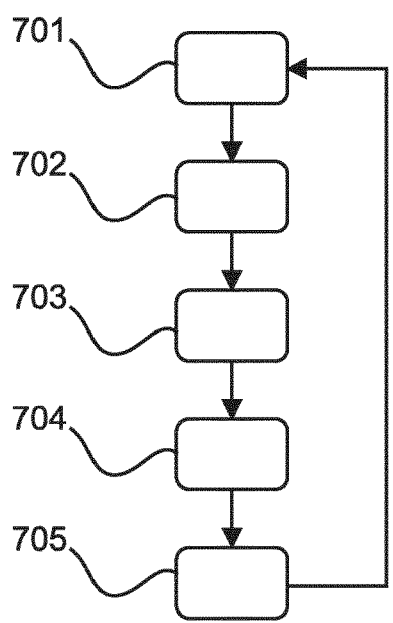
FIG. 7 shows a flow diagram of a zone-based location procedure according to a second embodiment.

FIG. 7 shows a flow diagram of a zone-based location procedure according to a second embodiment.

In a first step 701 anchor nodes that are within range of a target radio unit with unknown location are selected, so that the signal strengths or qualities between the anchor nodes and the target radio unit can be measured. In a subsequent step 702, identifiers of the selected anchor nodes are used to measure the signal strengths or qualities between the target radio unit and the radio anchors. In step 703, the obtained anchor node identifiers and corresponding signal strengths or qualities are used to derive the related hyper zones of the anchor nodes and to compute for each hyper zone a group strength or quality (e.g., average strength or quality of the anchor nodes of the hyper zone). Then, in step 704, hyper zones of each type with the highest group strength are selected. Finally, in step 705, the intersection region of the selected hyper zones of each type is determined, e.g., based on a look-up table or arithmetic logic using the hyper-zone identifiers, and the coordinates or other geographical indication of the intersection region is output as the estimated location of the target radio unit. The arrow starting from step 705 back to step 701 indicates that the location method can be continuously repeated.

To summarize, a method and system for refined zoning via intersection have been described, wherein anchor nodes 200 of a zone-based positioning system are divided into multiple hyper zones 40, 50 in different ways, where different ways of dividing the hyper zones may be orthogonal to each other, with possibly partial overlapping. For each way of dividing the hyper zones 40, 50, the most likely candidate hyper zone is selected based on a user zoning method. Thereafter, the intersection 42 of the identified hyper zones is taken as the final location result of a mobile node to be located, to thereby achieve refined user location accuracy without increasing the density of the anchor nodes 200.

While the invention has been illustrated and described in detail in the drawings and foregoing description, such illustration and description are to be considered illustrative or exemplary and not restrictive. The invention is not limited to the disclosed embodiments. The selection of the relevant hyper zones may be based on other signal strength or quality indicators, such as error rate, signal-to-noise ratio, etc. The proposed zone-based location approach can be used in retail, industry, hospitality, and outdoor applications, or for user-location based illumination or other control functions.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIG. 7 or those of blocks 120, 140 and 150 of FIG. 1 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus configured to locate a radio unit relative to a plurality of anchor nodes, the anchor nodes being radio units with known locations, wherein the apparatus comprises:

an identification unit for receiving identification information of selected anchor nodes and respective signal strength or quality information of radio links between the radio unit to be located and the selected anchor nodes, and for identifying hyper zones of intersecting types for each of the selected anchor nodes, wherein hyper zones of a respective type extend along one respective direction out of a plurality of different directions, each hyper zone comprising at least two of the anchor nodes;

a selection unit for calculating for each of the identified hyper zones an allocated single hyper-zone signal strength or quality based on the received respective signal strength or quality information of radio links of anchor nodes belonging to the hyper zone, and for selecting a hyper zone with highest hyper-zone signal strength or quality for each type of hyper zones; and an intersection unit for determining an intersection region of the selected hyper zones with highest hyper-zone signal strength or quality and for deriving a location information of the intersection region as the location of the radio unit to be located.

2. The apparatus of claim 1, wherein the selection unit is adapted to calculate the single hyper-zone signal strength or quality for each of the identified hyper zones by averaging the received respective signal strength or quality information of radio links of anchor nodes belonging to the hyper zone.

3. The apparatus of claim 1, wherein the hyper zones of intersecting types are configured to extend in orthogonal directions.

4. The apparatus of claim 1, wherein the signal strength or quality information of the radio links comprises a received signal strength indicator, RSSI, value.

5. The apparatus of claim 1, wherein the hyper zones of a single type are configured to overlap each other partially.

6. The apparatus of claim 1, wherein the identification, selection and intersection units are comprised in a localization unit which is configured as a programmable processing unit for performing operations and computations to derive an estimated location of the radio unit to be located.

7. A radio device comprising the apparatus of claim 1.

8. The radio device of claim 7, wherein the radio device is adapted to determine the identification information of the selected anchor nodes and the respective signal strength or quality information of the radio links between a mobile radio device and the selected anchor nodes.

9. A location system comprising the apparatus of claim 1 and a plurality of anchor nodes.

10. The location system of claim 9, further comprising a collecting device for determining the identification information of the selected anchor nodes and for collecting from the selected anchor nodes the respective signal strength or quality information of the radio links between a mobile radio device and the selected anchor nodes.

11. A lighting network comprising the location system of claim 9, wherein anchor nodes are comprised in luminaires of the lighting network.

12. A method of locating a radio unit relative to a plurality of anchor nodes, the anchor nodes being radio units with known locations, wherein the method comprises:
    receiving identification information of selected anchor nodes and respective signal strength or quality information of radio links between the radio unit to be located and the selected anchor nodes;
    identifying hyper zones of intersecting types for each of the selected anchor nodes, wherein hyper zones of a respective type extend along one respective direction out of different directions, each hyper zone comprising at least two of the anchor nodes;
    calculating for each of the identified hyper zones an allocated single hyper-zone signal strength or quality based on the received respective signal strength or quality information of radio links of anchor nodes belonging to the hyper zone;
    selecting a hyper zone with highest hyper-zone signal strength or quality for each type of hyper zones;
    determining an intersection region of the selected hyper zones with highest hyper-zone signal strength or quality; and
    deriving a location information of the intersection region as the location of the radio unit to be located.

13. A non-transitory computer-readable medium encoded with a computer program comprising code means for performing the method of claim 12 when executed by one or more computer processors.

* * * * *